United States Patent
Kaas

[11] Patent Number: 5,680,494
[45] Date of Patent: Oct. 21, 1997

[54] FC-TYPE OPTICAL FIBER CONNECTOR ADAPTER

[75] Inventor: Craig S. Kaas, Toms River, N.J.

[73] Assignee: Bell Atlantic Network Services, Inc., Arlington, Va.

[21] Appl. No.: 649,418

[22] Filed: May 16, 1996

[51] Int. Cl.[6] .................................................. G02B 6/38
[52] U.S. Cl. ........................... 385/56; 385/147; 385/66; 385/67
[58] Field of Search ........................... 385/56–69, 147

[56] References Cited

U.S. PATENT DOCUMENTS

| | | | |
|---|---|---|---|
| 4,759,601 | 7/1988 | Knutsen et al. | 385/61 |
| 4,793,683 | 12/1988 | Cannon, Jr. et al. | 385/60 |
| 4,805,980 | 2/1989 | Mackenroth | 385/60 |
| 4,834,486 | 5/1989 | Walker | 385/134 |
| 4,880,291 | 11/1989 | Aberson, Jr. et al. | 385/55 |
| 4,900,125 | 2/1990 | Iyer | 385/70 |
| 5,067,783 | 11/1991 | Lampert | 385/60 |
| 5,073,042 | 12/1991 | Mulholland et al. | 385/69 |
| 5,142,597 | 8/1992 | Mulholland et al. | 385/56 |
| 5,233,675 | 8/1993 | Cannetti | 385/75 |
| 5,274,729 | 12/1993 | King et al. | 385/59 |
| 5,297,227 | 3/1994 | Brown et al. | 385/56 |
| 5,384,885 | 1/1995 | Diner | 385/60 |
| 5,408,557 | 4/1995 | Hsu | 385/60 |
| 5,530,783 | 6/1996 | Belopolsky et al. | 385/60 |
| 5,542,015 | 7/1996 | Hultermans | 385/60 |

FOREIGN PATENT DOCUMENTS

| | | | |
|---|---|---|---|
| 0 014 610 | 8/1980 | European Pat. Off. | 385/56 |
| 26 28 747 | 1/1977 | Germany | 385/60 |
| 58-130311 | 8/1983 | Japan | 385/56 |
| 61-228408 | 10/1986 | Japan | 385/60 |
| 62-139506 | 6/1987 | Japan | 385/60 |
| 1-314213 | 12/1989 | Japan | 385/60 |
| WO90/15350 | 12/1990 | WIPO | 385/56 |

*Primary Examiner*—John Ngo
*Attorney, Agent, or Firm*—Lowe, Price, LeBlanc & Becker

[57] ABSTRACT

An FC-type optical fiber connector adapter, such as an FC/PC optical fiber connector adapter, is provided with a circumferential flange and at least one substantially radially extending projection for mounting in a panel designed to accommodate biconic optical fiber connector adapters. In one embodiment, the FC-type optical fiber connector adapter contains a circumferential groove with an O-ring to facilitate a tight frictional connection.

17 Claims, 1 Drawing Sheet

FC-TYPE OPTICAL FIBER CONNECTOR ADAPTER

TECHNICAL FIELD

The present invention relates to an FC-type optical fiber connector adapter for mounting in a panel structured to accommodate biconic optical fiber cable connector adapters. The present invention has particular utility in linking FC/PC optical fiber cables through a panel structured for biconic optical fiber cable linkages.

BACKGROUND ART

There are currently installed numerous, probably hundreds of thousands, of biconic optical fiber cable linkages at terminals to optical fiber cables servicing individual customers. Such conventional biconic optical fiber terminals comprise a plurality of housed bulkheads or panels, each panel having a number of holes, usually six, each hole structured to accommodate a biconic optical fiber connector adapter therein. A conventional biconic optical fiber connector adapter is secured within a hole of the panel by a plurality of, typically two projections, e.g., bayonet-type projections, extending from a circumferential mounting flange in a substantially radial direction. Each biconic optical fiber connector adapter is secured within a separate panel hole, each hole having a wall with a corresponding groove structure accommodating the substantially radial projections on the biconic optical fiber connector adapter.

A conventional biconic optical fiber connector adapter comprises internally threaded end portions structured to accept a conventional biconic optical fiber plug assembly. Biconic optical fiber panels, connector adapters and plug assemblies are conventional and, hence, not set forth herein in great detail.

Biconic optical fiber systems have been found to lack the requisite high performance, such as high speed transmission, for future sophisticated services, such as video services. Moreover, biconic optical fiber systems experience reflection loses. Accordingly, biconic optical fiber systems are currently undergoing replacement with FC (Ferrule Connector) -type of optical fiber systems, such as FC/PC (Ferrule Connector/Physical Contact) optical fiber systems.

Conventional FC-type optical fiber systems, such as FC/PC optical fiber systems, comprise linkages at a panel. Conventional FC/PC optical fiber linkages comprise an FC/PC optical fiber connector adapter affixed to the panel by a plurality of screws. Conventional FC/PC optical fiber connector adapters comprise end portions, each having a threaded tubular outer coupling flange with an elongated retaining slot longitudinally disposed thereon, and a coupling flange concentrically disposed within the threaded tubular outer coupling flange defining a circular center hole with an annular inside flange therearound. Each such end portion accepts an FC/PC optical fiber plug assembly terminating an optical fiber cable. Such a conventional FC/PC optical fiber connector adapter further comprises a centrally located circumferential rectangular flange with holes through which the FC/PC optical fiber connector adapter is mounted to the panel with screws. See, for example, Hsu, U.S. Pat. No. 5,408,557. FC/PC optical fiber plug assemblies are conventional and, hence, not set forth herein in great detail.

The replacement of biconic optical fiber systems with FC/PC optical fiber systems on an individual basis as the need arises is acutely problematic, because of the different manner in which biconic vis-à-vis FC/PC optical fiber connector adapters and respective panels are structured for mounting. Conventional biconic optical fiber connector adapters are currently mounted in panel holes by means of substantially diametrically opposed, substantially radially extending projections; whereas, conventional FC/PC optical fiber connector adapters are mounted to panels by a plurality of screws through holes provided in a central rectangular circumferential flange. Thus, conventional biconic optical fiber systems are linked by adapters mounted in panels which do not accept conventional FC/PC optical fiber connector adapters. Therefore, existing biconic optical fiber linkages by means of biconic optical fiber connector adapters mounted in panels cannot be replaced on an individual basis as the need arises.

The fundamental incompatibility problem of conventional FC/PC and installed biconic optical fiber connector adapters and accommodating panels has caused an inordinate expenditure of time and resources. The conventional procedure for replacing a biconic optical fiber linkage with an FC/PC optical fiber linkage requires replacing the entire panel structured to accommodate biconic optical fiber connector adapters with a panel structured to accommodate conventional FC/PC optical fiber connector adapters comprising a central rectangular circumferential flange with screw holes. Therefore, all biconic optical fiber linkages at a particular panel must be replaced with FC/PC optical fiber linkages even though only one biconic optical fiber linkage requires replacement. Moreover, all biconic optical fiber linkages at the panel must be replaced in the same operation. This conventional replacement procedure is fraught with numerous problems, particularly problems related to scheduling all customers linked at a particular panel, even those customers unaffected by the particular biconic optical fiber linkage requiring replacement with an FC/PC optical fiber linkage. Acute problems are frequently encountered in scheduling downtime for five customers linked through a typical biconic optical fiber panel in order to replace one biconic optical fiber linkage with an FC/PC optical fiber linkage. Conventional technology offers no solution to this pressing problem of replacing existing biconic optical fiber linkages with FC/PC optical fiber linkages on an individual basis as the need arises.

Lampert, U.S. Pat. No. 5,067,783, discloses a connector system comprising a panel containing a plurality of openings which accommodate buildout blocks therein. Each buildout block comprises a tubular portion having a longitudinally extended keyway formed in a wall thereof and extending from a flanged end which includes track and latching means. The buildout block also comprises first and second cavities which communicate with each other through an opening in an internally disposed wall with the first cavity opening to the flanged end of the buildout block and a second cavity opening to an opposite end thereof. The buildout block mounted in each opening of a panel is adapted to receive an ST® connector at one end and a buildout at the other end thereof. One type of buildout is designed to receive an ST® connector, while another type of buildout contains a key threaded sleeve adapted to receive an FC-type of ferrule connector and is mounted to the buildout block by means of bayonet-type guides extending from a circumferential flange, one of which is provided with a locking portion. The buildout block itself comprises first and second coaxially aligned tubular portions extending in opposite directions from a flanged portion with means adapted to cooperate with the track and launching means of the buildout block to secure the buildout to the buildout block upon suitable relative rotation between the buildout and the buildout block.

Cannon, Jr. et al., U.S. Pat. No. 4,793,683, disclose a solution to the alignment problem of aligning single optical fiber cables in forming biconic fiber optic connections. The disclosed solution to the alignment problem comprises an alignment sleeve having opposite end cavities each of which accommodates a biconic fiber optic plug assembly terminating an optical fiber. A peripheral end portion of at least one end of the sleeve is provided with a notch adapted to receive a key projection from a plug as the plug is inserted into the sleeve cavity, thereby locking the plug in the sleeve. Also disclosed is a panel containing a separable buildout block comprising two arcuately formed diametrically opposed portions and comprising a slot for receiving a snap lock tab extending radially from a housing of the buildout containing the alignment sleeve which accommodates the biconic fiber optic plug assembly terminating an optical fiber cable.

Mackenroth, U.S. Pat. No. 4,805,980, discloses a universal fiber optic termination system comprising an external threaded sleeve at each end thereof and an axially central radial flange projection. The core has opposed frusto-conical surfaces extending through the sleeve. An adapter is threaded on the sleeve and shaped to conform to the termination element or plug assembly of the fiber optic cable undergoing coupling.

Cannetti, U.S. Pat. No. 5,233,675, discloses a fiber optic connector comprising a selectively positioned attenuation barrel forming part of a connector plug assembly. The disclosed improved fiber optic connector is said to differ from prior art fiber optic connectors by providing a rotatory locking pin which prevents relative rotationally movement between the attenuation barrel and an ST® adapter itself which comprises a body having an elongated hollow shank with a keyed slot and a pair of bayonet lugs for engaging the corresponding structure on a connector plug element. A portion of the outer surface is threaded for engagement by an internally threaded nut abutting a radially extending surface of a bayonet mount for mounting within a circular opening in a wall or bulkhead.

Knutsen et al., U.S. Pat. No. 4,759,601, disclose a connector assembly for mechanically and optically associating a first optical fiber exposed to high pressure and/or temperature fluids with a second optical fiber exposed to low pressure conditions, with a hermetically sealed rigid transparent window therebetween. Sealing means are provided in the form of an elastomeric O-ring positioned in an outer annular groove. The housing comprises a generally tubular member having a passageway therethrough with first and second opposite ends thereof adapted to receive a high pressure connector member and a low pressure connector member, respectively. The housing is threaded into a bulkhead and provided with O-rings to ensure hermetic sealing.

As previously discussed, Hsu, U.S. Pat. No. 5,408,557 discloses an FC-type optical fiber connector adapter comprising front and rear casings fastened together by screws. Each casing comprises a threaded tubular outer coupling flange, an elongated retaining slot longitudinally disposed on a tubular outer coupling flange, a tubular inner coupling flange concentrically disposed within the tubular outer coupling flange and defining a circular center hole, and an annular inside flange on the tubular inner coupling flange around the circular center hole of the front casing communicates with the circular center hole of the back casing. The adapter is affixed to a panel by means of screws through the holes provided in circumferential flange.

King et al., U.S. Pat. No. 5,274,729, disclose a panel for mounting optical fiber connectors, which panel contains a plurality of openings for accommodating buildout systems. Each buildout system contains a buildout block having a portion disposed on the rear side of the panel and adapted to accommodate an optical fiber connector assembly. Any of three different buildout blocks may be employed to receive a desired type of fiber optic connector, i.e., an ST, SC or FC-fiber optic connector. The buildout is secured to the buildout block on the front side of the panel by a latching arrangement, which buildout may have any one of three configurations to accept any one of three different types of fiber optic connectors. By appropriate selection of the buildout system, the buildout and buildout block may be selected to accommodate various combinations of fiber optic connectors.

Walker, U.S. Pat. No. 4,834,486, discloses an adapter for mounting fiber optic connector sleeves having different external shapes to a panel. The disclosed system comprises a connector sleeve holder having opposed first and second sides with a channel extending therebetween. The channel walls include a first floor parallel to the first side located within the first and second sides, a second floor parallel to the second side located between the second side and the first floor, a first sidewall adapted to snugly receive a first fiber optic connector sleeve having a first external shape between the first side and the first floor, and the second sidewall adapted to receive a second fiber optic connector sleeve having a second external shape between the second side and the second floor. A disclosed preferred embodiment comprises a third sidewall adapted to snugly receive a third fiber optic connector sleeve having a third external shape located between the first side and the first floor and the fourth sidewall adapted to snugly receiving a fourth fiber optic connector sleeve having a fourth external shape located between the second side and second floor.

Diner, U.S. Pat. No. 5,384,885, discloses an FC coupling system comprising a bulkhead or panel coupling arrangement having a bore therethrough accommodating a female-female adapter which in turn comprises first and second members mounted on opposing faces of the panel. The first and second members each comprises a mounting flange with an internally threaded sleeve member. A separate and contiguous internal sleeve member extends through the bore and is held in place by split seam members. The first and second members are affixed to the panel and to each other by a plurality of bolts. The disclosed improvement comprises means for varying the insertion loss of the coupling assembly in the form of a second keyway on a coupling member angularly spaced from the first keyway for producing a rotational offset of the end face of the first optical fiber relative to the end face of the second optical fiber.

Conventional optical fiber linkage systems, particularly those comprising buildout systems, are rather cumbersome and do not address the pressing problem of replacing a plethora of biconic optical fiber linkages with FC-type optical fiber linkages, on an individual basis, through existing panels or bulkheads structured to accommodate a biconic optical fiber connector adapter. Accordingly, there exists a need to provide a simplified efficient, time saving way to replace existing biconic with FC-type optical fiber linkages on an individual basis without disrupting service to existing customers serviced by biconic optical fiber linkages through the same panel as the biconic optical fiber linkage requiring replacement.

DISCLOSURE OF THE INVENTION

An object of the present invention is an FC-type optical fiber connector adapter structured to link FC-type of optical fiber plug assemblies, particularly FC/PC optical fiber plug assemblies, through existing panels structured for biconic optical fiber connector adapters.

Another object of the present invention is a method of replacing a biconic with an FC-type optical fiber linkage through an existing panel on an individual basis without disrupting service to other customers biconically linked through the same panel as the biconic optical fiber linkage undergoing replacement.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by an FC-type optical fiber cable connector adapter comprising: a central portion containing a circumferential cylindrical mounting having at least one projection extending therefrom in a substantially radial direction; and a coupling flange at each end of the central portion adapted to receive an FC-type optical fiber plug assembly.

Another aspect of the present invention is an FC/PC optical fiber connector adapter comprising: a central portion containing a circumferential cylindrical mounting having two projections extending therefrom in a substantially radial direction; a coupling flange at each end of the central portion adapted to receive an FC/PC optical fiber plug assembly; a circumferential groove on the mounting spaced longitudinally from the projections; and an O-ring disposed within the circumferential groove.

A further object of the present invention is a method of linking FC-type optical fiber plug assemblies through a panel containing a plurality of holes therethrough, each hole structured to receive an optical fiber connector adapter having at-least one projection extending in a substantially radial direction therefrom, which method comprises: drawing a first FC-type optical fiber plug terminating an optical fiber cable through a first hole from a first side of the panel to a second side of the panel; connecting the first FC-type optical fiber plug assembly to a first end of an FC-type optical fiber connector adapter; connecting a second FC-type optical fiber connector terminating an optical fiber cable to a second end of the FC-type optical fiber connector adapter; wherein the FC-type optical fiber connector adapter comprises: a central portion containing a circumferential cylindrical mounting with at least one projection extending therefrom in a substantial radial direction; and a coupling flange at each end of the central portion adapted to receive an FC-type optical fiber plug assembly; inserting the first end of the FC-type optical fiber connector adapter with the first FC-type optical fiber plug assembly connected thereto into the first hole from the second side of the panel; and rotating the FC-type optical fiber connector adapter so that the at least one projection engages a corresponding groove structure within the first hole wall to secure the FC-type optical fiber connector adapter in the panel.

Additional objects and advantages of the present invention will become readily apparent to those having ordinary skill in the art from the following detailed description, wherein only the preferred embodiments of the invention are shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
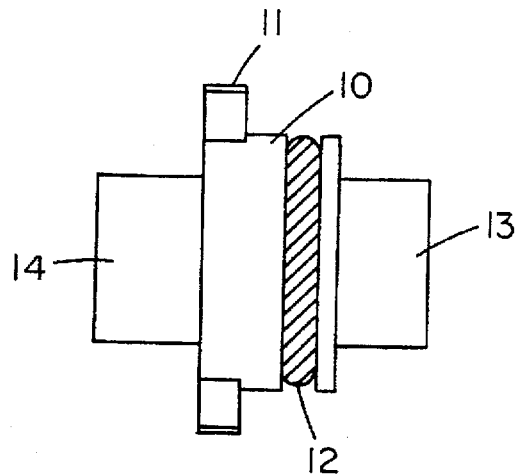
FIG. 1 depicts an FC-type optical fiber connector adapter in accordance with the present invention.

The present invention addresses and solves the particularly acute, time consuming and scheduling problems attendant upon replacing existing biconic optical fiber linkages through a panel via a biconic optical fiber connector adapter with FC-type, particularly FC/PC, optical fiber linkages through the same panel on an individual basis without affecting other linkages at the same panel. Existing panels structured to receive biconic optical fiber connector adapters comprise a plurality of holes, typically six holes. The wall of each hole comprises an appropriate groove construction to accept substantially radially extending projections by which such biconic optical fiber connector adapters are mounted to the panels. Conventional FC/PC optical fiber connector adapters comprise a central rectangular circumferential flange with holes for screw mounting to a conventional FC/PC panel through which FC/PC optical fiber plug assemblies are conventionally linked.

In accordance with the present invention, an FC/PC optical fiber connector adapter is provided which can be efficiently and effectively mounted to a conventional panel structured to receive a biconic optical fiber connector adapter, thereby enabling efficient replacement of one or more biconic optical fiber linkages with an FC/PC optical fiber linkage, as the need arises, without disrupting or otherwise affecting existing optical fiber linkages through the same panel. In accordance with the present invention, one or more biconic optical fiber linkages can be easily and efficiently replaced with an FC/PC optical fiber linkage without inconveniencing other customers serviced by optical fiber linkages through the panel. Thus, the resulting panel can contain one or more biconic and one or more FC/PC optical fiber linkages.

The FC-type optical fiber connector adapter in accordance with the present invention is preferably designed to accommodate a conventional FC/PC optical fiber plug assembly at each end. Thus, the FC/PC optical fiber connector adapter in accordance with the present invention is similar in functional features to conventional FC/PC adapters insofar as accommodating a conventional FC/PC optical fiber plug assembly at each end. The present FC/PC optical fiber connector adapter comprises, at each end thereof, a flanged connector for receiving a conventional FC/PC optical fiber plug assembly terminating an optical fiber cable. The connector comprises a threaded tubular outer coupling flange having an elongated retaining slot disposed thereon, and a tubular inner coupling flange concentrically disposed within the threaded tubular outer coupling flange defining a circular center hole with an annular inside flange therearound. Since such terminal structures for accommodating conventional FC/PC optical fiber plug assemblies and FC/PC optical fiber plug assemblies are conventional, the details of their construction are not described herein in great detail.

The FC/PC optical fiber connector adapter in accordance with the present invention differs structurally and functionally from conventional FC/PC optical fiber connector adapters in that it contains means for mounting to existing panels structured to receive biconic optical fiber connector adapters. Accordingly, the FC/PC optical fiber connector adapter of the present invention enables rapid and efficient replacement of one or more biconic optical fiber linkages in an existing panel with an FC/PC optical fiber linkage without affecting service to other customers linked through the same panel.

The FC/PC optical fiber connector adapter in accordance with the present invention comprises a central circumferential cylindrical mounting means for securing the FC/PC optical fiber connector adapter to a panel structured to receive a biconic optical fiber connector adapter. The mounting means comprises a central circumferential cylindrical flange having one or more projections extending in a substantially radial direction therefrom. In a preferred embodiment, two substantially diametrically opposed projections are provided, similar to bayonet-type projections, for mounting in a panel structured to receive a biconic optical fiber connector adapter. Such biconic panels contain holes, each hole having a wall grooved to accept such radially extending projections.

In a preferred embodiment of the present invention, a circumferential groove is provided in the circumferential cylindrical mounting flange spaced longitudinally from the radially extending projections. An O-ring, preferably a conventional O-ring made of an elastomeric material, is disposed in the circumferential groove. The circumferential groove with an O-ring advantageously enables rapid and tight-fitting insertion of the FC/PC optical fiber connector adapter in and removal from a conventional biconic optical fiber cable panel. The tight frictional fit afforded by the O-ring resists disconnection and/or damage to the optical fibers due to vibration. The radially extending projections, which can be of any convenient cross-sectional shape, such as rectangular or square, enable the present FC/PC optical fiber connector adapter to be secured and unsecured, upon rotation, within a hole of a conventional biconic optical fiber panel.

Thus, in accordance with the present invention, an FC/PC optical fiber connector adapter is provided which can be rapidly, efficiently and tight-fittingly inserted into a hole of an existing, in service, conventional biconic optical fiber panel and secured thereto by rotation to engage the radially extending projections with the cooperating grooved structure in the wall of the hole. The FC/PC optical fiber connector adapter of the present invention, therefore, dramatically simplifies rapid replacement of existing biconic with FC/PC optical fiber linkages on an individual basis, with an attendant significant economic benefit.

The present invention also comprises a method of efficiently replacing existing biconic optical fiber linkages with an FC/PC optical fiber linkage in a rapid simplified manner on an individual basis. In accordance with the present invention, a first FC/PC optical fiber plug assembly terminating an optical fiber cable is drawn through a hole in an existing biconic optical fiber panel from a first side to a second side, preferably after disconnecting a biconic optical fiber linkage. The first FC/PC optical fiber plug assembly is then connected to a first end of the FC/PC optical fiber connector adapter of the present invention. A second FC/PC optical fiber plug assembly terminating an optical fiber cable is connected to the second end of the present FC/PC optical fiber connector adapter. The second FC/PC optical fiber plug assembly can be connected to the present FC/PC optical fiber connector adapter prior to drawing the first FC/PC optical fiber plug assembly through the hole and/or prior to connecting the first FC/PC optical fiber plug assembly to the present FC/PC optical fiber connector adapter.

After linking the first and second FC/PC optical fiber plug assemblies, the first end of the present FC/PC optical fiber connector adapter is inserted back into the hole of the panel and rotated to engage the radially extending projections, thereby securing the FC/PC optical fiber connector adapter to the existing biconic optical fiber panel.

In a preferred embodiment, the FC/PC optical fiber connector adapter of the present invention comprises a circumferential groove containing an elastomeric O-ring in the circumferential mounting flange longitudinally spaced from the projections. When the FC/PC optical fiber connector adapter is inserted into a hole of an existing biconic optical fiber panel, the O-ring frictionally engages the wall of the hole before the radially extending projections engage the grooved structure in the hole wall. The elastomeric O-ring enables a rapid, tight-fitting connection for the FC/PC optical fiber connector adapter of the present invention and, after insertion, provides frictional resistance to disconnection and protection against damage to the optical fiber due to vibrations.

An FC-type adapter of the present invention is illustrated in FIG. 1 and comprises a circumferential cylindrical mounting flange 10 from which two substantially diametrically opposed projections 11 extend in a substantially radial direction. In accordance with the preferred embodiment of the present invention, a longitudinally spaced circumferential groove containing an O-ring 12 is provided to enable rapid, tight-fitting insertion into a hole of an existing biconic panel. The O-ring advantageously provides frictional resistance to loosening of the inserted adapter due to vibrations and/or unintended rotation of the projections. The tight-fitting O-ring also protects the optical fiber cables from damage, such as abrasive damage due to vibrations. Each terminal portion 13, 14, of the present FC-type optical fiber connector adapter accommodates an FC-type optical fiber plug assembly, preferably an FC/PC optical fiber plug assembly.

Figure 2:
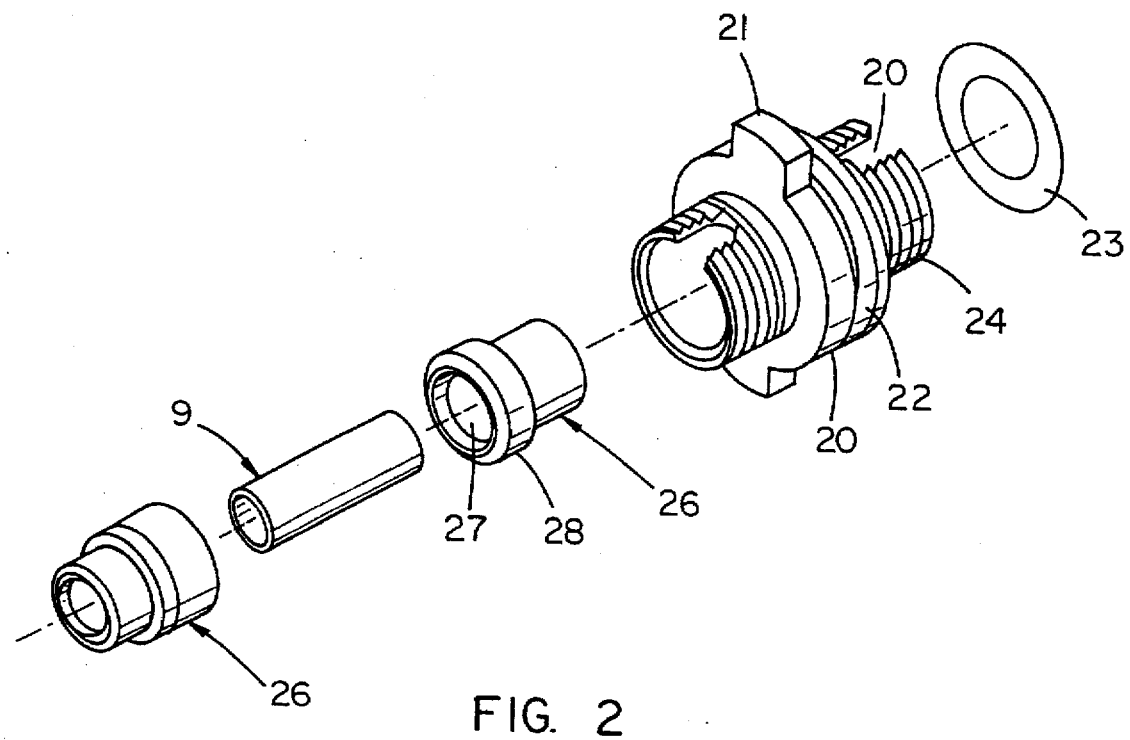
FIG. 2 depicts an FC/PC optical fiber connector adapter in accordance with the present invention.

An FC/PC optical fiber connector adapter of the present invention is shown in FIG. 2, and comprises circumferential mounting flange 20 having two projections 21 extending therefrom in a substantially radially direction. A circumferential groove 22 is formed in the mounting flange 20 spaced apart from the projections for accommodating a conventional O-ring 23 of an elastomeric material. Each end of the present FC/PC optical fiber connector adapter comprises an externally threaded outer tubular coupling flange 24 having an elongated retaining slot 26 longitudinally disposed thereon. A tubular inner coupling flange 26 is concentrically disposed within each threaded outer tubular coupling flange 24 to define a substantially circular centerhole 27 with a surrounding annular flange 28. A central split sleeve 29 is provided within circular centerhole 27 and retained therein. Split sleeve 29 has an inner diameter adapted to accommodate an outer diameter of an FC/PC optical fiber plug assembly.

One having ordinary skill in the art can easily arrive at the dimensions of each feature of the present FC/PC optical fiber connector adapter given the disclosed function of linkage FC/PC optical fiber plug assemblies via existing panels structured to receive biconic optical fiber connector adapters. For example, it has been found that the FC/PC optical fiber connector adapter of the present invention can be suitably provided with an overall length of about two inches, with outer tubular coupling flanges having a length of about three-quarters of an inch and an internal diameter of about one inch. The radial projections can extend from the circumferential mounting distance of about three-eights of an inch, and the circumferential groove can be spaced from the radial projections by a distance of about nine thirty-seconds of an inch and comprise an opening about one-quarter of an inch. As previously mentioned, the panels to which the FC/PC optical fiber connector adapter of the present invention is structured for mounting is conventional as are FC/PC plug assemblies. Accordingly, one having ordinary skill in the art can vary the dimensions of the features of the present FC/PC optical fiber connector adapter for a particular situation.

Although the present invention has been illustrated with respect to an FC/PC optical fiber system, it is not limited thereto, but is capable of being employed with other FC-type optical fiber systems. The accommodating flanges at each end of the present FC-type optical fiber connector adapter can be appropriately structured to accommodate any conventional FC-type of optical fiber plug assembly.

Thus, in accordance with the present invention, the replacement of one or more biconic optical fiber linkages on an individual basis is dramatically simplified, thereby avoiding acute scheduling problems attendant upon conventional practices of replacing an entire biconic panel with an FC-type panel. In accordance with the present invention, an FC-type, preferably an FC/PC optical fiber connector adapter is provided for linking FC/PC optical fiber plug assemblies and replacing biconic optical fiber linkages with FC/PC optical fiber linkages on an individual basis via existing panels structured to accommodate biconic optical fiber connector adapters. The FC/PC optical fiber connector adapter of the present invention preferably comprises a circumferential groove longitudinally disposed from substantially radial projections accommodating an elastomeric O-ring for tight frictional connection within panel holes, thereby enabling an immediate tight-fitting connection, and preventing disconnection and/or optical fiber damage due to vibrations.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

I claim:

1. An FC-type optical fiber connector adapter comprising:
   a central portion containing a circumferential cylindrical mounting, thereon having at least one projection extending therefrom in a substantially radial direction; and
   a coupling flange at each end of the central portion adapted to receive an FC-type optical fiber plug assembly.

2. The FC-type optical fiber connector adapter according to claim 1, comprising two substantially diametrically opposed projections.

3. The FC-type optical fiber connector adapter according to claim 2, further comprising:
   a circumferential groove on the mounting spaced longitudinally from the projections; and
   an O-ring disposed within the circumferential groove.

4. The FC-type optical fiber connector adapter according to claim 3, wherein the O-ring is made of an elastomeric material.

5. The FC-type optical fiber connector adapter according to claim 3, wherein each coupling flange is adapted to receive an FC/PC fiber optic plug assembly.

6. The FC-type optical fiber connector adapter according to claim 5, comprising an externally threaded tubular outer coupling flange at each end of the central portion, each coupling flange having an elongated retaining slot longitudinally disposed thereon, and a tubular inner coupling flange concentrically disposed within the threaded tubular outer coupling flange defining a substantially circular center hole with a surrounding annular flange.

7. The FC-type optical fiber connector adapter according to claim 6, further comprising a central split sleeve within the circular center hole retained by each annular inner flange, which split sleeve has an inner diameter adapted to accommodate an outer diameter of an FC/PC fiber optic plug assembly.

8. The FC-type optical fiber connector adapter according to claim 2, in combination with and mounted in a panel, which panel comprises a plurality of substantially circular holes, each hole having a wall with a corresponding structure for engaging the projections on the FC-type optical fiber connector adapter and for engaging substantially radially extending projections of biconic optical fiber connector adapters, wherein the FC-type optical fiber connector adapter has an FC-type fiber optic plug assembly received in each end thereof.

9. The combination according to claim 8, wherein the FC-type optical fiber connector adapter further comprises a circumferential groove on the mounting spaced longitudinally from the at least one projection; and
   an O-ring disposed within the circumferential groove.

10. The combination according to claim 9, wherein the O-ring is made of an elastomeric material.

11. The combination according to claim 9, further comprising at least one biconic optical fiber linkage through the panel, which biconic optical fiber linkage contains a biconic optical fiber connector adapter secured within a hole in the panel and having a biconic optical fiber plug assembly received at each end thereof.

12. The combination according to claim 9, wherein the FC-type optical fiber connector adapter contains an FC/PC optical fiber plug assembly received in each end thereof.

13. A method of linking FC-type optical fiber plug assemblies through a panel containing a plurality of holes therethrough, each hole structured to receive an optical fiber connector adapter having at least one projection extending in a substantially radial direction therefrom, which method comprises:
   drawing a first FC-type optical fiber plug assembly terminating an optical fiber cable through a first hole from a first side of the panel to a second side of the panel;
   connecting the first FC-type optical fiber plug assembly to a first end of an FC-type optical fiber connector adapter;
   connecting a second FC-type optical fiber connector terminating an optical fiber cable to a second end of the FC-type optical fiber connector adapter; wherein the FC-type optical fiber connector adapter comprises:
   a central portion containing a circumferential cylindrical mounting with at least one projection extending therefrom in a substantial radial direction; and
   a coupling flange at each end of the central portion adapted to receive an FC-type optical fiber plug assembly;

inserting the first end of the FC-type optical fiber connector adapter with the first FC-type optical fiber plug assembly connected thereto into the first hole from the second side of the panel; and rotating the FC-type optical fiber connector adapter so that the at least one projection engages a corresponding groove structure within the first hole wall to secure the FC-type optical fiber connector adapter in the panel.

14. The method according to claim 13, wherein: the FC-type optical fiber connector adapter further comprises a circumferential groove on the mounting spaced longitudinally from and between the at least one projection and first end, an O-ring disposed within the circumferential groove, whereby the O-ring frictionally engages the wall of the hole upon insertion of the first end of the FC-type optical fiber connector adapter into the hole before the at least one projection engages the corresponding groove structure in the first hole wall.

15. The method according to claim 14, wherein the FC-type optical fiber connector adapter comprises a coupling flange at each end of the central portion adapted to receive an FC/PC optical fiber plug assembly.

16. The method according to claim 15, wherein:

the panel comprises at least one biconic optical fiber linkage terminated by a plug assembly received in opposite ends of a biconic optical fiber connector adapter mounted within a hole in the panel secured by substantially radially extending projections engaging a corresponding groove structure in the panel hole; and the method further comprises replacing at least one of the biconic optical fiber cable linkages with an FC/PC optical fiber cable linkage.

17. The method according to claim 13, wherein the FC-type optical fiber connector adapter comprises two projections extending from the mounting.

* * * * *